United States Patent
Imai

(10) Patent No.: US 6,307,856 B1
(45) Date of Patent: *Oct. 23, 2001

(54) METHOD OF ESTABLISHING CONNECTION

(75) Inventor: Takashi Imai, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,493

(22) Filed: Aug. 22, 1997

(30) Foreign Application Priority Data

Mar. 19, 1997 (JP) .................................. 9-066949

(51) Int. Cl.⁷ .......................... H04L 12/28; H04L 12/56; G06F 11/00
(52) U.S. Cl. .......................... 370/395; 370/410; 714/746
(58) Field of Search .................................. 370/394, 395, 370/410, 428, 242, 248, 252; 395/200.57, 200.62; 714/18, 2, 748, 749, 3, 746, 750, 4; 358/409, 436

(56) References Cited

U.S. PATENT DOCUMENTS

| | | |
|---|---|---|
| 5,101,404 | 3/1992 | Kunimoto et al. . |
| 5,119,370 | 6/1992 | Terry . |
| 5,220,563 | 6/1993 | Grenot et al. . |
| 5,303,236 | 4/1994 | Kunimoto et al. . |
| 5,724,356 * | 3/1998 | Parameswaran Nair et al. ... 370/401 |
| 5,737,332 * | 4/1998 | Corrigan et al. ..................... 370/394 |
| 5,751,719 * | 5/1998 | Chen et al. .......................... 370/473 |

FOREIGN PATENT DOCUMENTS

| | | |
|---|---|---|
| 3-234137 | 10/1991 | (JP) . |
| 4-100449 | 4/1992 | (JP) . |
| 4-154230 | 5/1992 | (JP) . |
| 5-48639 | 2/1993 | (JP) . |
| 5-219114 | 8/1993 | (JP) . |
| 5-260160 | 10/1993 | (JP) . |
| 06205038 | 7/1994 | (JP) . |
| 07-022775 | 2/1995 | (JP) . |
| 08186580 | 7/1996 | (JP) . |
| 08279814 | 10/1996 | (JP) . |
| 9-205436 | 8/1997 | (JP) . |

OTHER PUBLICATIONS

–ITU–T Study Group 11 (1993–1996), Telecommunications Standardization Sector of ITU, General Aspects of B–ISDN, "Broadband Integrated Services Digital Network Overview—Signalling Capability Set 1, Release 1", International Telecommunication Union, Q–2010(02/95), pp. 1–8, Printed in Switzerland, Geneva, 1995.

(List continued on next page.)

Primary Examiner—Alpus H. Hsu
Assistant Examiner—Duc Ho
(74) Attorney, Agent, or Firm—Helfgott & Karas, P.C.

(57) ABSTRACT

A connection is established by transmitting and receiving protocol data between two face-to-face apparatuses to prevent a timer count from being started due to a detection of error if variables are not coincident in SAAL. On this occasion, if the transmitting side apparatus is restarted, this restart is judged, and a variable possessed by the transmitting side apparatus is initialized. The protocol data is stored with information indicating the restart and transmitted to the receiving side apparatus. The receiving side apparatus, upon receiving the protocol data, initializes a variable possessed by the receiving side apparatus based on the restart information. The receiving apparatus can promptly enter a restart sequence without collating with other variables by storing the protocol data with the information showing the restart. The restart can be executed without being restricted by a stopping time of a timer.

7 Claims, 7 Drawing Sheets

OTHER PUBLICATIONS

–ITU–T Study Group 11 (1993–1996), Telecommunication Standardization Sector of ITU, Broadband ISDN, "B–ISDN Signalling ATM Adaptation Layer (SAAL) Overview Description", International Telecommunication Union, Q–2100(07/94), pp. 1–3, Printed in Switzerland, Geneva, 1995.

–ITU–T Study Group 11 (1993–1996), Telecommunication Standardization Sector of ITU, Broadband ISDN, "B–ISDN ATM Adaptation Layer–Service Specific Connection Oriented Protocol (SSCOP)", International Telecommunication Union, Q.2110(07/94), pp. 1–95, Printed in Switzerland, Geneva, 1995.

* cited by examiner

METHOD OF ESTABLISHING CONNECTION

BACKGROUND OF THE INVENTION

The present invention relates to a technique effective in an application to establish a connection in SVC services for an ATM switching system.

In SVC (Switched Virtual Channel services for an ATM system, a connection establishing protocol in SAAL (Signalling ATM Adaptation Layer) is prescribed (ITU-T Recommendation Q.2110, TTC Standard JT-Q2110, ATM Forum Q.SAAL).

According to this protocol, in case a fault happens in one of two face-to-face apparatuses, e.g., one of nodes on a layer 2, more specifically, one of a workstation and an ATM switching equipment, the fault apparatus is restarted after being completely repaired and comes to an initial status, at which time the following data link establishment and restoring process are implemented.

FIG. 1 shows a sequence for establishing a data link according to a prior art. In this SAAL, to start with, a beginning-of-connection protocol data unit (BGN-PDU: Begin-Protocol Data Unit: Request for Initialization) is transmitted to the other apparatus (from the A-apparatus to the B-apparatus in FIG. 1). FIG. 2 illustrates a format of this BGN-PDU.

In a sequence 1 shown in FIG. 1, when both of the A- and B-apparatuses are initialized, "0" is substituted into a variable VT (Transmitter State Variable) (SQ) and VR (Receiver State Variable) (SQ) for detecting retransmissions from respective variable memory units 1a, 1b. Further, VR(R) for storing a sequence number of SD-PDU to be received next, is also initialized (VR(R)=0).

Next, "1" is added to VT(SQ) in the A-apparatus (VT(SQ)=1), and VT(SQ) is mapped into N(SQ) in BGN-PDU. BGN-PDU is then transmitted to the B-apparatus.

In the B-apparatus receiving BGN-PDU, N(SQ) in BGN-PDU is compared with a value of VR(SQ) of the variable memory unit 1b. Herein, N(SQ)=1, and VR(SQ)=0. Because of the two values being different (N(SQ)≠VR(SQ)), the B-apparatus judges that BGN-PDU is not data retransmitted from the A-apparatus. Then, the normal sequence is thereafter executed in the B-apparatus, thereby establishing a data link. At this time, "1" is substituted into each of the variables VT(SQ) and VR(SQ) of the variable memory unit 1b. More specifically, the A-apparatus thereafter transmits SD-PDU (Sequence Data PDU) provided with a sequence number N(S)=0, 1, 2, (n-1) . . . , 1) . . . , and also transmits data needed for setting a VRB connection. The B-apparatus increments VR(R) by "1" (+1) every time it receives SD-PDU. Referring to FIG. 1, because of being in a state of receiving SD-PDU having the sequence number N(S)=1, N of SD-PDU to be received next is expressed such as N(S)=2, and therefore VR(R)=2.

Explained next is a protocol establishing sequence in a case where the A-apparatus is restarted in the as-is state of the sequence 1 due to a fault, and reverts to the initial state.

When the A-apparatus is initialized, the variable VT(SQ) is initialized in the variable memory unit 1a such as VT(SQ)=0. Next, "1" is added to VT(SQ) (VT(SQ)=1), and this is mapped into N(SQ) in BGN-PDU and then transmitted to the B-apparatus.

On the other hand, when receiving BGN-PDU in the B-apparatus, N(SQ) is compared with VR(SQ) in the variable memory unit 1b. Herein, VR(SQ) does not change after the sequence 1 and therefore remains to be "1". Further, VR(R) is stored with N(S)=2, which is the smallest sequence number of SD-PDU to be received next.

At this moment, the variable VR(SQ) becomes such as VR(SQ)=N(SQ) in the B-apparatus, and it is to be judged that BGN-PDU concerned is retransmitted from the A-apparatus. A process based on the retransmission is thereby executed in the B-apparatus, and the variables in the variable memory unit 1b are not updated.

Incidentally, VR(R) retentive of the smallest sequence number of SD-PDU to be received in this state is also in the as-is state, and therefore, when making an attempt to perform the data communications with a transition to a subsequent sequence, there might be produced a discrepancy between VR(R) and N(S) in SD-PDU to be transmitted next (N(S)=1, and VR(R)=2). This results in an error judgement. Consequently, the data communications in SAAL suffer from a temporary service interruption.

At this moment, in a higher-order layer (ITU-T Recommendation Q.2931, TTC Standard JT-Q2931, ATM Forum Q.93B), a REST (initial setting) message for implementing a call release is transmitted from the A-apparatus to the B-apparatus. The REST message transmitted first is, however, disposed of as the data communications in SAAL are put into the service-interrupted state described above. Herein, the REST message must be retransmitted after a timer T316 has counted for just two minutes pursuant to the TTC standards. Accordingly, there might inevitably be a 2-minute delay of the call release.

Namely, in the sequence 2 shown in FIG. 2, the transmitting side (the A-apparatus) has reverted to the initial state, but nevertheless the variable is not yet initialized on the receiving side (the B-apparatus). This might conduce to a discrepancy between the variables in the respective variable memory units 1a, 1b, which represent an inbetween state.

The present invention contrived in view of the above problems aims at actualizing a prompt call release by avoiding an occurrence of timer stoppage due to an error sequence, which involves initializing two apparatuses when one apparatus is restarted.

SUMMARY OF THE INVENTION

The present invention obviates the above problems by the following constructions.

According to a first aspect of the present invention, on the occasion of establishing a connection by transmitting and receiving protocol data between two sets of face-to-face apparatuses, if a restart takes place in the transmitting side apparatus, this restart is judged, and a variable possessed by the transmitting side apparatus is initialized. Then, protocol data are stored with information representing the restart and transmitted to the receiving side apparatus. Just when the receiving side apparatus receives the protocol data, a variable possessed by the receiving side apparatus is initialized based on the restart information.

Namely, the receiving apparatus can promptly enter a restart sequence without collating with other variables by storing the protocol data with the information indicating the restart. Therefore, the restart can be done without being restricted by a timer stopping time.

According to a second aspect of the present invention, in the first aspect thereof, the information indicating the restart is stored in a user area of the protocol data.

A direct indication of the restart can be given to the receiving side apparatus without changing a protocol data format by storing a part of the user area of the protocol data with the information showing the restart.

According to a third aspect of the present invention, on the occasion of establishing a connection by transmitting and receiving protocol data between two sets of face-to-face apparatuses, if a restart takes place in the transmitting side apparatus, this restart is judged, and a variable possessed by the transmitting side apparatus is initialized. Then, protocol data purporting the restart are transmitted from the transmitting side apparatus to the receiving side apparatus. Subsequently, in the receiving side apparatus receiving the protocol data, a variable possessed is initialized.

According to a fourth aspect of the present invention, on the occasion of establishing a connection by transmitting and receiving protocol data between two sets of face-to-face apparatuses, when the receiving side apparatus receives the protocol data stored with information purporting a retransmission of data, this receiving side apparatus judges whether it is the retransmission or the restart.

That is to say, if a judgement in the receiving side apparatus shows the restart, the receiving side apparatus is restarted prior to a retransmitting process, thereby enabling prevention of the discordance in terms of protocol from the transmitting side apparatus. It is therefore feasible to avoid the apparatus from being in the stopped state with a start of timer counting due to the discordance in terms of protocol, and the call release can be promptly carried out.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be described with reference to the drawings.

Figure 1:
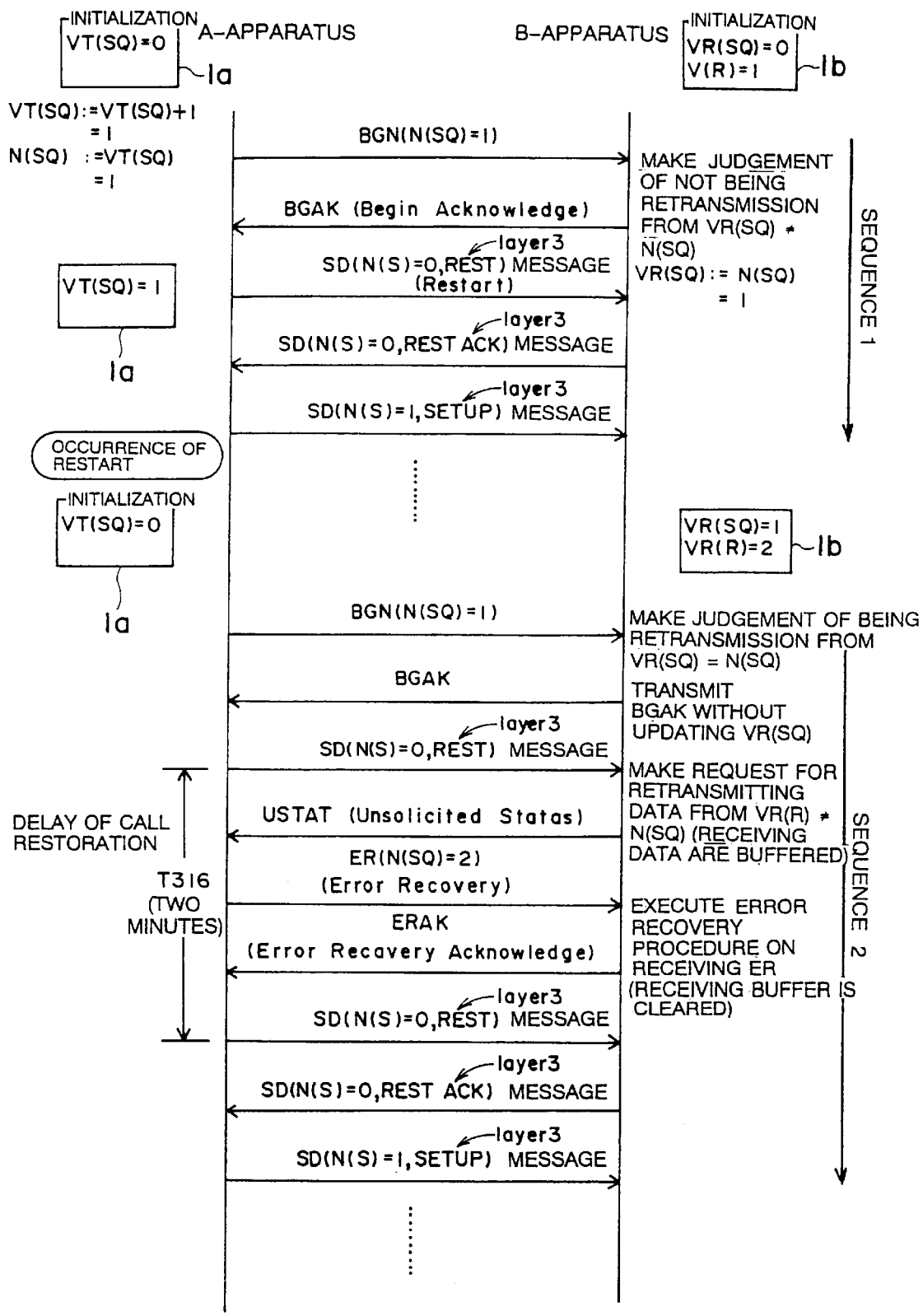
FIG. 1 is an explanatory diagram showing an SAAL connection establishing sequence in the prior art.
Figure 2:
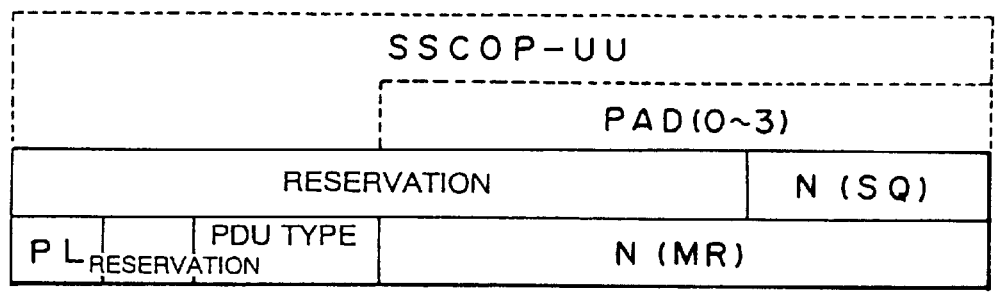
FIG. 2 is an explanatory diagram showing a structure of a BGN-PDU format in the prior art.
Figure 3:
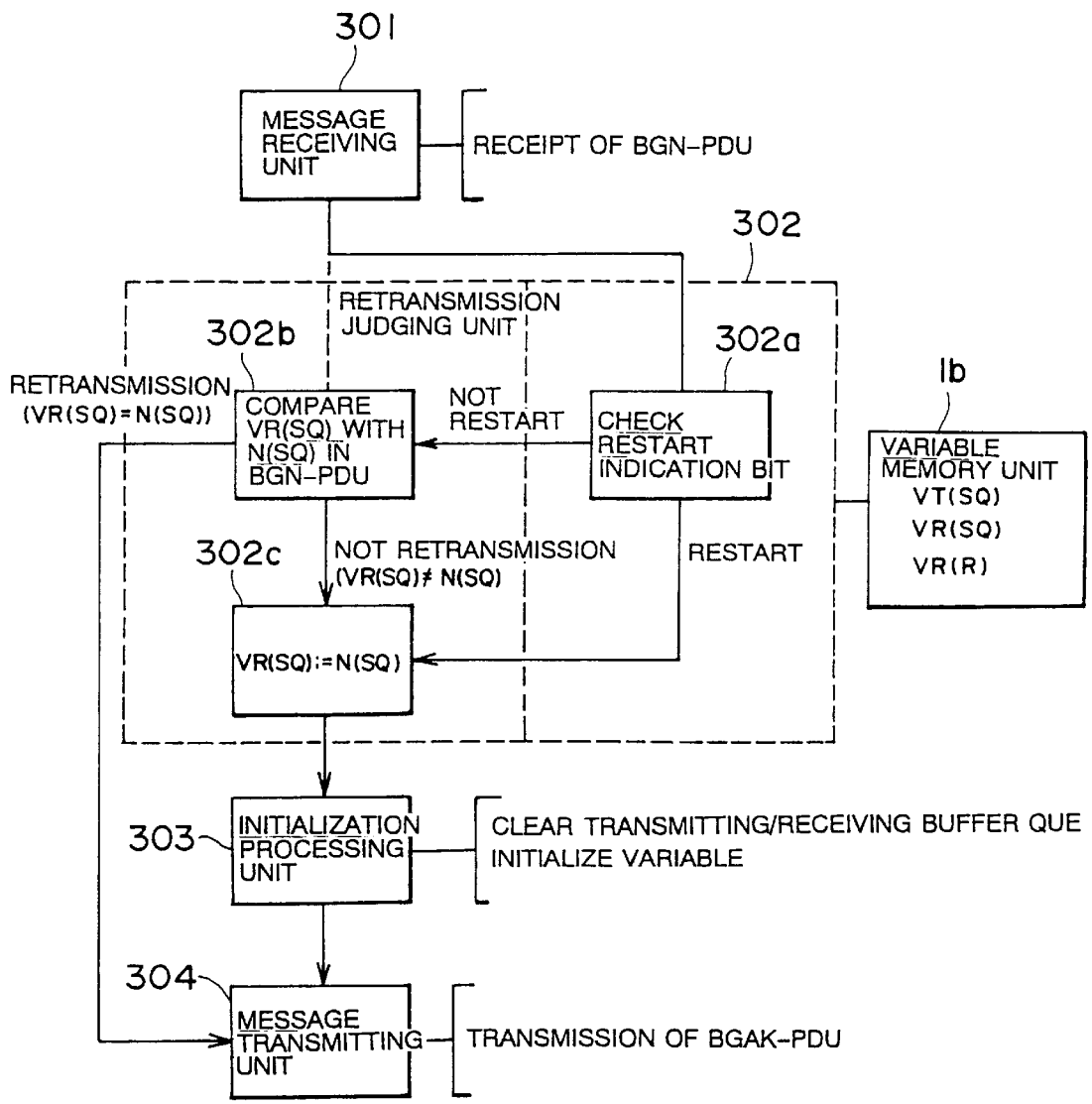
FIG. 3 is a block diagram illustrating a principal construction, for establishing a connection, of a B-apparatus on the receiving side in an embodiment of the present invention.

FIG. 3 is a block diagram showing a principal construction, for establishing a connection, of a B-apparatus on a receiving side. An A-apparatus on a transmitting side has basically the same construction.

Referring to FIG. 3, a variable memory unit $1b$ is stored with variables VT(SQ), VR(SQ) and VR(R). These variables are status variables used for prescribing an inter-coordinate-layers protocol, and have meanings which follow.

(VT(SQ) and VR(SQ))

The variable VT(SQ) is a transmitting-side connection sequence states variable, and is used for making an identification as to whether each of PDUs of BGN, ER (Error Recovery) and RS (Resynchronization) is retransmitted on the receiving side. This status variable VT(SQ) is initialized to "0" when starting an SSCOP process, then added one by one before transmitting each of PDUs of new GBN, RS or ER, and mapped into an N(SQ) field of PDU.

Namely, when receiving each of PDUs of BGN, ER and RS, on the receiving side, there might be a necessity for distinguishing whether it is a new transmission or retransmission, and executing a process thereon. In case each of PDUs of BGAK, ERAK and RSAK, which are to be sent back from the receiving side to the transmitting side, is lost on the midway of its being sent back, the transmitting side is unable to distinguish this from a case where each of PDUs of BGN, ER and RS is lost. It therefore follows that each of PDUs of BGN, ER and RS is retransmitted in wait for a completion of counting by a timer. If, e.g., BGAK-PDU is lost in the course of being transmitted back, on the receiving side, the status correctly transits to a data transfer status after receiving BGN-PDU, and BGN-PDU retransmitted is to be received in this status. At this time, whether or not PDU is retransmitted is judged as follows.

When receiving first PDU, the receiving side stores its own VR(SQ) with N(SQ) in this PDU. Then, the receiving side, when receiving PDU retransmitted, compares N(SQ) in PDU with its own VR(SQ). If coincident with each other, a judgement is that PDU is retransmitted, and therefore it proves that the receipt of PDU is normal, and that PDU is lost on the midway of being sent back.

When transmitting PDU in a new sequence, on the transmitting side, "1" is added to VT(SQ), thus mapping it into new N(SQ).

(VR(R))

The variable VR(R) serving as a receiving status variable is stored with a smallest sequence number of PDU prearranged to be received next. Upon an arrival of PDU of a prearranged sequence number, it is newly updated to a smallest sequence number of PDU prearranged next.

Referring to FIG. 3, a message receiving unit 301 has a function of receiving PDU (which is herein BGN-PDU) transmitted from the A-apparatus on the transmitting side, extracting restart indication variables R(N) and N(SQ), from within PDU, and notifying a retransmission judging unit 302 of the extracted variables.

The retransmission judging unit 302 is constructed of a restart indication bit checking unit 302a, a comparing unit 302b and a non-retransmission processing unit 302c. The restart indication bit checking unit 302a checks a value of the restart indication variable R(N) in PDU. If this value is "1", the restart indication bit checking unit 302a makes a judgement of being a restart and notifies the non-retransmission processing unit 302c of this judgement. The non-retransmission processing unit 302c notifies an initialization processing unit 303 of a process of the restart (initialization of variable). Based on this notification, the initialization processing unit 303 initializes the respective variables (VR(SQ)=0, VR(R) =1). Then, after completing this initialization, a message transmitting unit 304 is indicated to transmit BaAK-PDU.

The restart indication bit checking unit 302, whereas if making a judgement of not being the restart from a checked result thereof, notifies the comparing unit 302b of this judgement. The comparing unit 302b compares the variable N(SQ) in PDU with the variable VR(SQ) in the variable memory unit 1b. Then, if two values are coincident with each other, a judgement is that PDU concerned is retransmitted, and the message transmitting unit 304 is notified of this judgement. Based on this notification, the message transmitting unit 304 transmits BGAK-PDU to the A-apparatus on the transmitting side.

Further, the comparing unit 302a, if the value of the variable VR(SQ) is not coincident with the value of the variable N(SQ), makes a judgement of not being the retransmission, the variable VR(SQ) is updated with the value of N(SQ) in the non-retransmission processing unit 302c.

Figure 4:
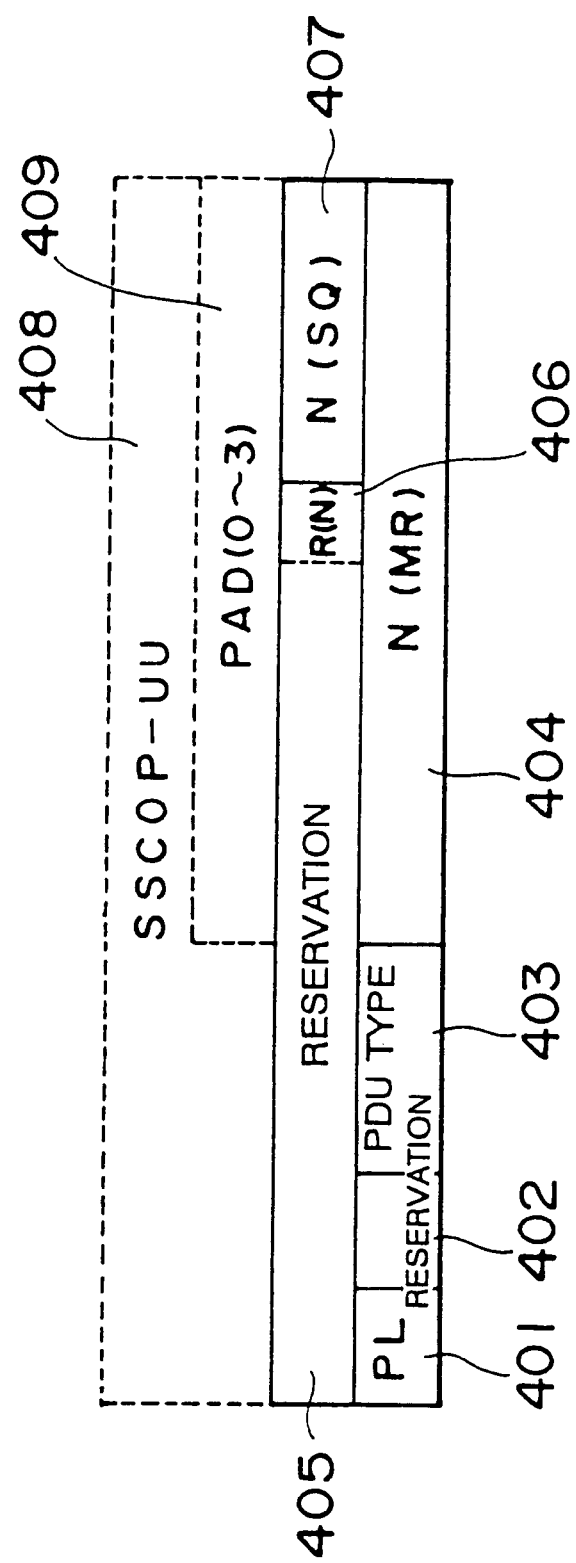
FIG. 4 is an explanatory diagram showing a structure of a BGN-PDU format in the embodiment of the present invention.

FIG. 4 shows a BGN-PDU format used in this embodiment.

BGN-PDU consists of a PL (Pad Length) field 401 representing a poll number, a reservation field 402, a PDU type field 403, an N(MR) variable field 404, a reservation field 405, a restart variable field R(N) 406, a variable field N(SQ) 407, a user field SSCOP-UU (User-to-User) (408), and an adjustment field PAD (409).

In the variable field N(MR) 404, VR(MR) in the variable memory unit 1a is mapped every time each of PDUs of STAT, USTAT, RS, RSAK, ER, ERAK, BGN or BGAK is generated. Then, this value becomes a fiducial value of a credit allowed on the receiving side.

The restart variable field R(N) 406 is a field for showing whether or not PDU concerned indicates a restart from the transmitting side. More specifically, when R(N)=1, it implies the restart, wherein the restarting process is forcibly executed without comparing a value of the variable field N(SQ) with the variable VR(R) held by itself on the receiving side.

The variable field N(SQ) 407 is stored with sequence number relative to connection control. Each time the transmitting side transmits each of PDUs of new BGN, RS or ER, the variable VT(SQ) in the variable memory unit 1a is mapped into N(SQ).

Figure 5:
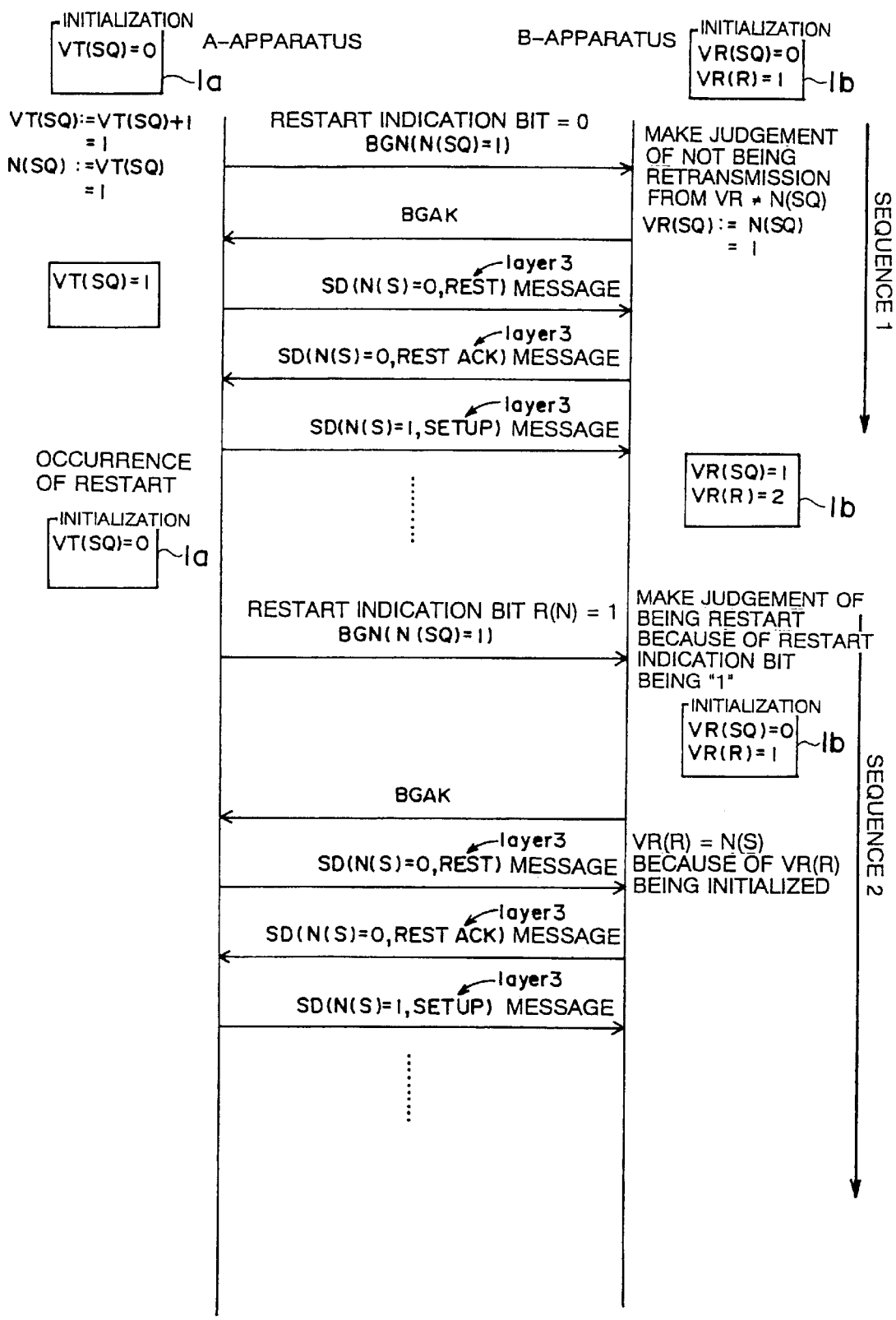
FIG. 5 is an explanatory diagram showing an SAAL connection establishing sequence in the embodiment of the present invention.

FIG. 5 is a sequence diagram showing how the protocol is established between the A- and B-apparatuses in this embodiment.

Referring to FIG. 5, to start with, both of the A- and B-apparatuses are initialized. Thereupon, VT(SQ) in the variable memory unit 1a of the A-apparatus is initialized to "0"; VR(SQ) in the variable memory unit 1b of the B-apparatus is initialized to "0"; and VR(R) is initialized to "1", respectively.

Then, VT(SQ) is incremented by "1" (+1) in the A-apparatus, and BGN-PDU with this value mapped into N(SQ) is transmitted to the B-apparatus. Note that the restart indication variable R(N) in PDU is stored with "0" at this moment.

In the B-apparatus receiving BGN-PDU described above, the retransmission judging unit 302 at first reads the restart indication variable R(N), and, because of this being "0", judges that the restart has no necessity for its being implemented in the B-apparatus (302 in FIG. 3). Subsequently,the variable N(SQ) possessed by itself is compared with VR(SQ) (302b in FIG. 3). Herein, N(SQ)=1, and VR(SQ)=0. Hence, N(SQ)≠VR(SQ), and it is judged that this PDU is not retransmitted. Then, an N(SQ)'s value, i.e., "1" is substituted into the variable VR(SQ) in the variable memory unit 1b.

Then, the message transmitting unit 304 transmits BGAK-PDU to the A-apparatus. Subsequently, the normal protocol sequence is thereafter executed.

Given next is an explanation of processing when only the A-apparatus is restarted in this state with reference to a lower half part of FIG. 5.

When restarted, the A-apparatus adds "1" to VT(SQ) initialized to N(SQ), and transmits BGN-PDU with "1" mapped into the restart indication field R(N). In the B-apparatus receiving this BGN-PDU, the retransmission judging unit 302 reads the restart indication bit R(N)in the restart indication field. Herein, this restart indication bit R(N) is "1", and hence the restart indication bit checking unit 302a makes a judgement of being the restart. The restart indication bit checking unit 302a then indicates the initialization processing unit 303 to initialize the B-apparatus through the non-retransmission processing unit 302c.

Based on this indication, the initialization processing unit 303 initializes the respective variables in the variable memory unit 1b (VR(SQ)=0, VR(R)=1). Then, the message transmitting unit 304 transmits BGAK-PDU back to the A-apparatus.

In the sequence thereafter, VR(R) in the variable memory unit 1b has been initialized, and hence N(SQ) in next PDU coincides with VR(R), which does not imply an error judgement.

As discussed above, in accordance with this embodiment, there is caused no stoppage of the timer count, which is attributed to the error judgement, so that a release of call can be promptly effected.

Figure 6:
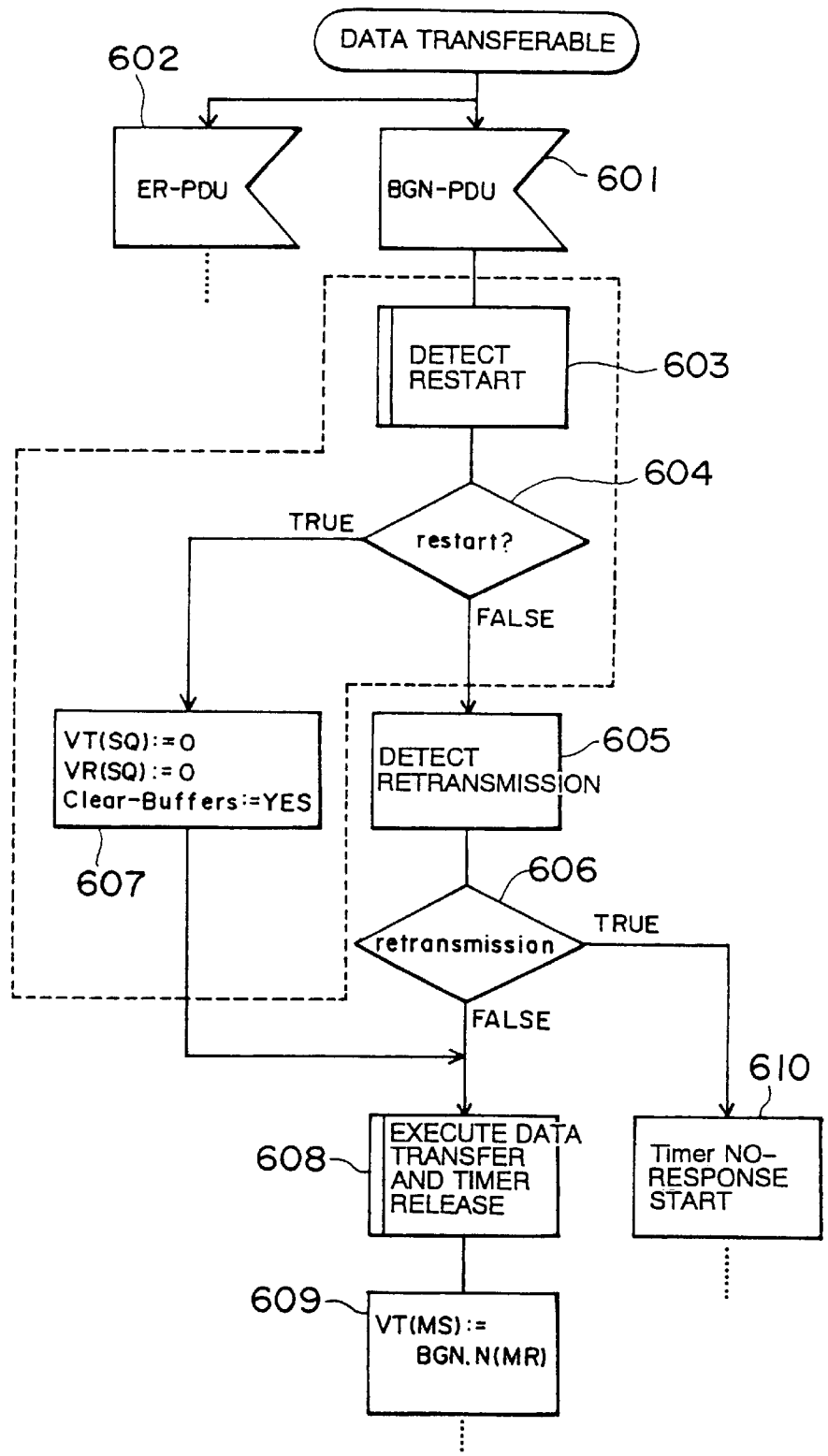
FIG. 6 is a flowchart showing procedures for establishing the connection in the embodiment of the present invention.

FIG. 6 is a flowchart showing the processes explained so far.

To be specific, when BGN-PDU is received by the B-apparatus (step 601), a detection as to whether restarted or not is made (603). If restarted, the variable is initialized (604, 607). Whereas if not restarted, whether it is the retransmission or not is judged. If retransmitted, the timer is started (604, 605, 606, 610). Whereas if not retransmitted, the timer for transferring the data is released, and N(MR) in BGN-PDU is mapped into VT(MS). Note that VT(MS) is a maximum transmitting status variable but is not used in this embodiment with an omission of explanation thereof.

Referring to FIG. 6, a flow area defined by a broken line is an area newly added in this embodiment.

Figure 7:
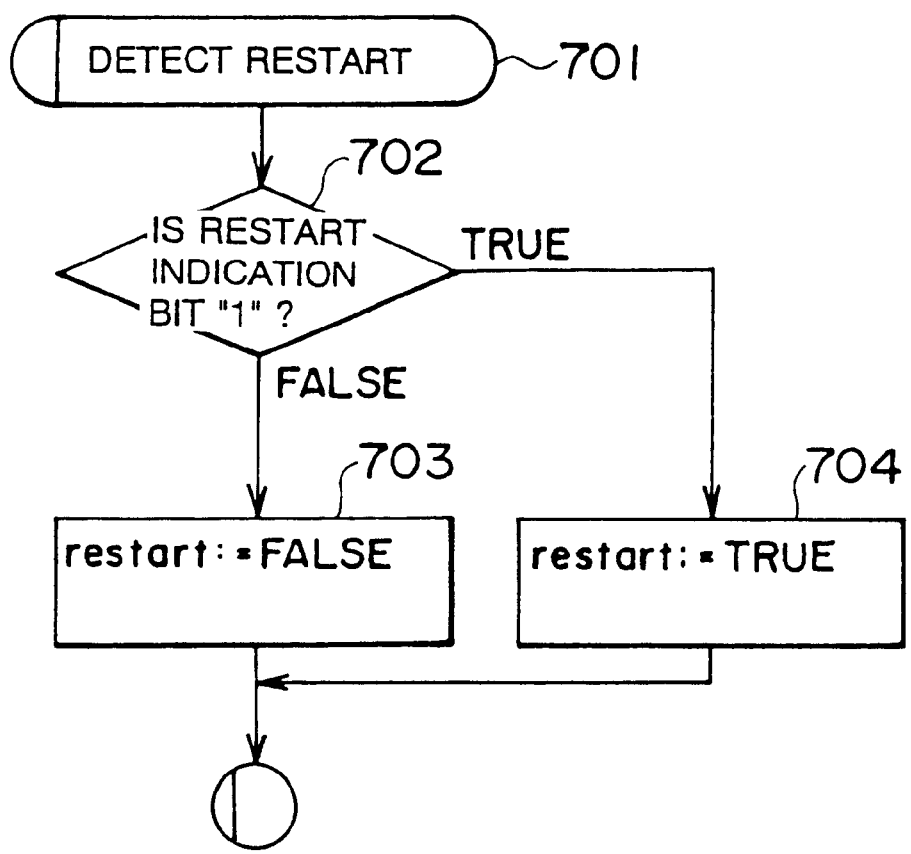
FIG. 7 is a flowchart showing procedures of processing by a restart judging unit in the embodiment of the present invention.

FIG. 7 is a flow of processes for a restart judgement by the restart judging unit 302.

Referring to FIG. 7, when a restart detection 701 is indicated, there is judged whether a restart indication variable R(N) is "1" or not (702). If the variable R(N) is "1", a judgement is that it is the restart whereby the restart is executed (704). Further, if the variable R(N) is "0", this leads to a judgement of not being the restart (705). Since the processes thereafter are the same as those explained in FIG. 3, the explanation thereof is omitted.

According to the present invention, when one apparatus is restarted, the other apparatus is also initialized, thereby avoiding an occurrence of timer stoppage due to the error sequence. This actualizes the prompt release of call.

A restart variable field R(N) of PDU is used to inform a restart in the embodiment described above. The embodiment of the present invention is not, however, limited to this construction. For example, a user field SSCOP-UU is usable to inform a restart in an embodiment.

It is apparent that, in this invention, a wide range of different working modes can be formed based on the invention without deviating from the spirit and scope of the invention. This invention is not restricted by its specific working modes except being limited by the appended claims.

What is claimed is:

1. A connection establishing method of establishing a connection in accordance to a communication protocol without acknowledge signal from receiver to transmitter for transmitted protocol data by transmitting and receiving protocol data between two apparatuses, to prevent a timer count from being started due to a detection of error if variables are not coincident in Signalling ATM Adaptation Layer(SAAL) said method comprising the steps of:

making a judgment as to a restart after losing communication status and initializing a variable possessed by said transmitting side apparatus into a predetermined value according to said communication protocol;

storing the protocol data with information indicating the restart and transmitting the protocol data and initializing a variable possessed by said receiving side apparatus, on the basis of the restart information, into said predetermined value according to said communication protocol.

2. A connection establishing method according to claim 1, wherein the information indicating the restart is stored in a user area of the protocol data.

3. A connection establishing method according to claim 1, wherein said apparatus receiving protocol data judges whether protocol data previously sent is retransmitted or connection establishing is restarted when receiving the protocol data stored with information purporting a retransmission of data by comparing a variable in the transmitted protocol data and said variable possessed by said receiving side apparatus.

4. A connection establishing method of establishing a connection in accordance to a communication protocol without acknowledge signal from receiver to transmitter for transmitted protocol data by transmitting and receiving protocol data between two apparatuses, to prevent a timer count from being started due to a detection of error if variables are not coincident in Signalling ATM Adaptation Layer (SAAL) said method comprising the steps of:

making a judgment as to a restart after losing communication status and initializing a variable possessed by said transmitting side apparatus into a predetermined value according to said communication protocol;

transmitting the protocol data purporting the restart; and receiving the protocol data and initializing a variable possessed by said receiving side apparatus into said predetermined value according to said communication protocol.

5. A connection establishing apparatus for establishing a connection in accordance to a communication protocol without acknowledge signal from receiver to transmitter for transmitted protocol data by transmitting and receiving protocol data between two apparatuses to prevent a timer count from being started due to a detection of error if variables are not coincident in Signalling ATM Adaptation Layer (SAAL) comprising:

judgment means for making judgment as to a restart after losing communication status and initializing a variable possessed by said transmitting side apparatus into a predetermined value according to said communication protocol;

storing means for storing the protocol data with information indicating the restart and transmitting the protocol data; and receiving means for receiving the protocol data and initializing a variable possessed by said receiving side apparatus, on the basis of the restart information, into said predermined value according to said communication protocol.

6. A connection establishing method of establishing a connection by transmitting and receiving protocol data between two apparatuses according to a communication protocol without an acknowledge signal from receiver to transmitter for transmitted protocol data, to prevent a timer count from being started due to a detection of error if variables are not coincident in Signalling ATM Adaptation Layer (SAAL) said method comprising the steps:

making a judgment as to a restart within said transmitting side apparatus and initializing a variable possessed by said transmitting side apparatus into a predetermined value according to said communication protocol;

storing the protocol data with information indicating the restart and transmitting the protocol data; and receiving the protocol data and initializing a variable possessed by said receiving side apparatus, on the basis of the restart information, into said predetermined value according to said communication protocol.

7. A connection establishing method of establishing a connection in accordance with a communication protocol without an acknowledge signal from receiver to transmitter for transmitted protocol data by transmitting and receiving protocol data between two apparatuses, to prevent a timer count from being started due to a detection of error if variables are not coincident in Signalling ATM Adaptation Layer (SAAL) said method comprising the steps of:

making a judgment as to a restart after losing communication status and initializing a variable possessed by said transmitting side apparatus into a predetermined value according to said communication protocol;

storing the protocol data with information indicating the restart and transmitting the protocol data and initializing a first variable and a second variable possessed by said receiving side apparatus, on the basis of the restart information, into said predetermined value according to said communication protocol, wherein the first variable retains a sequence number received previously and the second variable shows a next sequence number to be received.

* * * * *